Aug. 5, 1941.   E. E. NEAL   2,251,414
VALVE
Filed Oct. 29, 1940

Inventor:
Enoch E. Neal.
by Franklin E. Low
Att'y.

Patented Aug. 5, 1941

2,251,414

UNITED STATES PATENT OFFICE 2,251,414

VALVE

Enoch E. Neal, Malden, Mass.

Application October 29, 1940, Serial No. 363,242

8 Claims. (Cl. 251—10)

This invention relates to new and useful improvements in valves and has for its primary object to provide a valve which may be utilized in fluid pressure systems, as, for example, a steam heating system, where it is desirable that the fluid, or, condensation therefrom, may be permitted to drain automatically therethrough at all times when the pressure of the fluid in the system is relieved.

Another object of the invention is to provide a manually controlled gravity and pressure actuated valve to control the passage of a pressure fluid in one direction and also permit condensation to drain automatically therethrough in the opposite direction.

Another object of the invention is to provide a means in a valve of the character described whereby the volume of the drainage passing rearwardly through the valve may be controlled and also prevented entirely if it is so desired.

Still another object of the invention is to provide a valve having a valve actuating member and removable bearing member therefor positioned in axial alignment one with the other and also interchangeable in the valve casing to permit operation of the valve from either side thereof as circumstances and convenience may require.

The invention consists of a valve as set forth in the following specification and particularly as pointed out in the claims.

Referring to the drawing.

Like numerals refer to like parts throughout the several views of the drawing.

Figure 3:
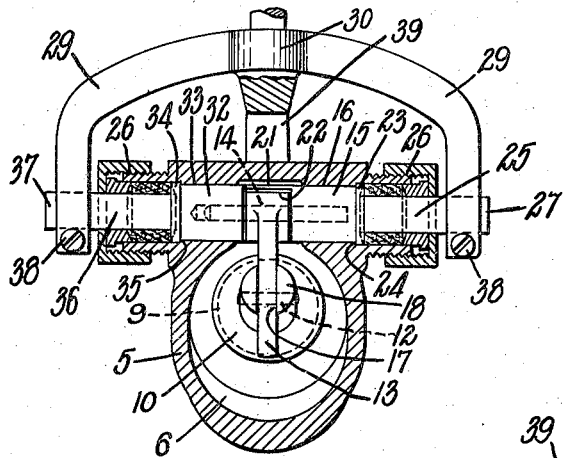
Fig. 3 is a transverse sectional elevation as taken on the line 3—3 of Fig. 2.
Figure 2:
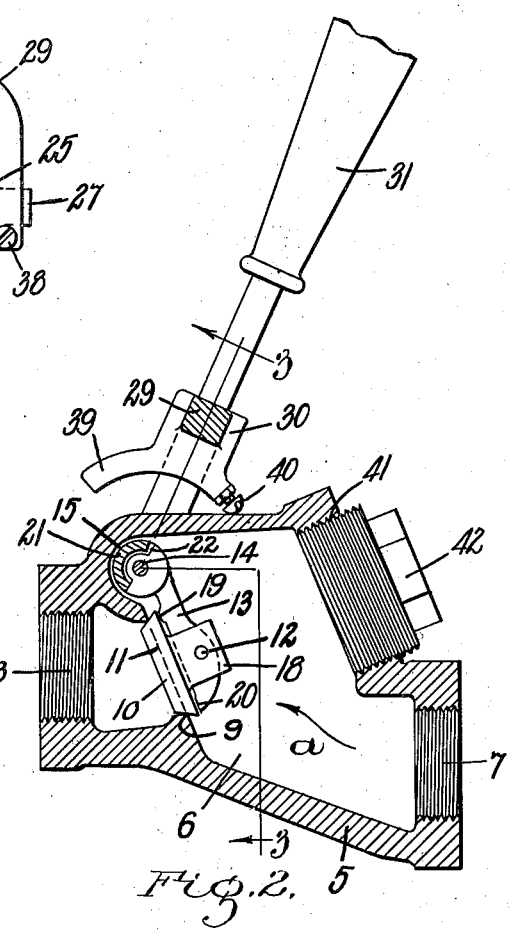
Fig. 2 is a central longitudinal sectional elevation of the valve.

In the drawing, 5 represents a valve casing of any suitable form and provided with a chamber 6 upon the interior thereof having an inlet passage 7 and a discharge passage 8 communicating therewith, both of which are screw threaded as may be required to receive fluid conducting pipes or pipe fittings. The longitudinal median line of the inlet passage 7 is lower than that of the discharge passage 8, and a pressure fluid as, for example, steam, normally flows through the valve in the direction of the arrow a, Fig. 2. To facilitate drainage of the pressure fluid or condensation therefrom through the valve the bottom surfaces of the chamber 6 and inlet passage 7 are located considerably below the bottom surface of the discharge passage 8.

Formed integral with the casing 5 and located within the chamber 6 at the inner end of the passage 8 is an inclined valve seat 9 in front of which a valve member 10 is mounted to hang loosely in an inclined position. The valve member 10 is provided with a tapered seat engaging surface 11 and is pivotally attached at 12 to a rocker arm 13 which in turn is pivotally mounted upon a bearing pin 14 an end of which is supported in a valve actuating member 15 which is mounted to oscillate in a bearing portion 16 of the valve casing 5. The rocker arm 13 extends through a slot 17 provided in an extension 18 of the valve member 10, and projections 19 and 20 provided upon the rocker arm limit the rocking movement of the valve member upon said arm. The valve actuating member 15 is extended at 21 to overlap the upper end portion of the rocker arm 13 and projects into a recess 22 provided in said arm. The extension 21 in effect constitutes an abutment upon the actuating member 15, and the recess 22 is slightly wider than said extension and thereby permits a slight amount of lost motion between the rocker arm 13 and valve actuating member 15, and opposite side walls of the recess 22 in effect constitute abutments upon the rocker arm. The lost motion between the valve actuating member 15 and rocker arm 13 permits the valve member 10 to open slightly when the pressure within the chamber 6 is relieved, thereby allowing condensation which may have accumulated upon the discharge passage side of the valve member 10 to drain rearwardly through the valve automatically.

The valve actuating member 15 is shouldered at 23 to engage an abutment 24 provided upon the casing 5, and a reduced portion 25 of said valve actuating member extends through a stuffing box 26 provided at the side of the valve casing. The outer extremity of the portion 25 of the valve actuating member 15 is flattened upon opposite sides thereof at 27 to fit a slot 28 provided in the extremity of either one of the arms 29 of a bifurcated manually operated member 30 which spans the valve casing 5 and stuffing boxes 26 and has an operating handle 31 fast thereto.

Co-operating with the valve actuating member 15 in supporting and positioning the rocker arm 13 and its valve member 10 in the casing 5 is a bearing member 32 mounted to oscillate in a bearing portion 33 of said casing upon the opposite side thereof from that upon which the bearing portion 16 and valve actuating member 15 are located and in axial alignment therewith, and said bearing member 32 constitutes a support for an end portion of the bearing pin 14 which projects thereinto. The bearing member 32 is shouldered at 34 to engage an abutment 35 provided upon the casing 5, and a reduced portion 36 of said bearing member extends through a stuffing box 26 provided at the side of the valve casing. The outer extremity of the portion 36 of the bearing member 32 is flattened upon opposite sides thereof at 37 to fit the slot 28 provided in the extremity of either one of the arms 29 of the manually operated member 30. The valve actuating member 15 and bearing member 32 are interchangeable in the valve casing 5, and the forked manually operated member 30 is attached to the flat end portions 27 and 37 of the valve actuating member 15 and bearing member 32 respectively by means of screws 38.

The manually operated member 30 is provided with a stop arm 39 and an adjustable stop screw 40, both of which are adapted to contact with the outer surface of the valve casing 5 to limit the movement of the member 30 to operate the valve actuating member 15. Furthermore, by manipulating the adjustable stop screw 40 the volume of the return condensation which may drain through the valve in a reverse direction from that indicated by the arrow a, Fig. 2, may be controlled; and if so desired the head of the screw 40 may be so positioned that automatic drainage of the condensation from the valve may be prevented entirely and the drainage controlled by the manual operation of the valve when the pressure of the fluid is shut off at its source. It is evident that any suitable type of operating handle may be provided for the valve actuating member 15 attached to the flattened end portion 27 thereof only, without any operating connection with the bearing member 32, the type of handle utilized being determined by the type of pressure fluid controlled and by the position of the valve with respect to other adjacent structures. An opening 41 in the valve casing 5 provided for the purpose of gaining access to the chamber 6 and valve mechanism located therein is normally closed by means of a screw threaded plug 42.

Figure 1:
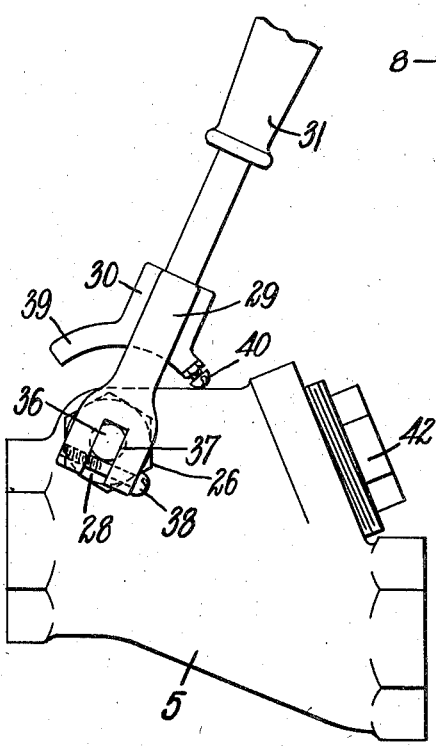
Fig. 1 is a side elevation of a valve embodying my invention.

The general operation of the valve hereinbefore specifically described is as follows: The valve member 10 is moved manually from its seat 9 to an open position to permit a pressure fluid to pass through the valve in the direction of the arrow a, Fig. 2, by grasping the operating handle 31 and rotating the valve actuating member 15 in a counterclockwise direction as viewed in Figs. 1 and 2. During this movement of the valve actuating member 15 the extension 21 upon said actuating member contacts with a wall of the recess 22 of the rocker arm 13 for the valve member 10 causing said arm to swing upwardly as determined by the movement of the bifurcated operating member 30, the stop arm 39 of which is preferably caused to abut against the outer surface of the casing 5. During this rotary movement of the valve actuating member 15 the extension 21 upon said actuating member contacts with a wall of the recess 22 of the rocker arm 13 for the valve member 10 causing said arm to swing upwardly as determined by the movement of the bifurcated member 30, the stop arm 39 of which is preferably caused to abut against the outer surface of the casing 5. During this rotary movement of the valve actuating member 15 the bearing member 32 rotates in unison therewith. In closing the valve the actuating member 15 is rotated in a clockwise direction allowing the rocker arm 13 and valve member 10 to drop until the valve member rests upon its seat 9 in which position the pressure fluid in the chamber 6 will hold the valve member tightly closed. When the pressure in the chamber 6 is relieved any pressure upon the opposite side of the valve member 10 such as may be caused by an accumulation of condensation within the system of which the valve forms a part will cause the valve member 10 to open slightly because of the movement permitted by the space between the extension 21 of the actuating member 15 and the wall of the recess 22, thereby permitting said condensation to drain automatically through the valve. The rotary movement of the valve actuating member 15 in opposite directions is restricted by the stop arm 39 and stop screw 40, and by adjusting the position of said screw the volume of the return condensation permitted to drain automatically from the valve is controlled and prevented entirely if so desired. When the valve member 10 is located in its open position the weight of the bifurcated member 30 and its operating handle 31 will overbalance the weight of the valve member and its supporting arm 13 if the actuating member 15 and bearing member 32 become loose in their stuffing boxes. The valve actuating member 15 and bearing member 32 are interchangeable in the valve casing 5 thereby permitting the valve to be operated from either side of said casing as circumstances may require. By forming the lower portion of the chamber 6 considerably below that of the passage 8 and lower edge of the valve member 10 condensation which is permitted to pass rearwardly through the valve by the automatic operation of said valve member is facilitated and the possibility of the valve member being prevented from operating because of the presence of frozen condensation in the chamber 6 is eliminated.

I claim:

1. A valve of the character described comprising, in combination, a casing provided with a chamber therein having inlet and discharge passages for a pressure fluid communicating therewith, a valve seat within said chamber at said discharge passage, a bearing member rotatably mounted in said casing, a gravity and pressure actuated valve member pivotally mounted upon said bearing member to close against said seat, an actuating member for said valve member loosely interlocked therewith to permit a slight amount of lost motion therebetween and mounted in the casing in axial alignment with the bearing member and interchangeable therewith, and means to operate said actuating member to open and close the valve member relatively to its seat, said valve member also being arranged to open automatically to permit the pressure fluid to drain rearwardly through the valve when the pressure of the fluid is relieved.

2. A valve of the character described comprising, in combination, a casing provided with a chamber therein having inlet and discharge passages for a pressure fluid communicating therewith, a valve seat within said chamber at said discharge passage, a bearing member rotatably mounted in said casing, a gravity and pressure actuated valve member pivotally mounted upon said bearing member to close against said seat, an actuating member for said valve member loosely interlocked therewith to permit a slight amount of lost motion therebetween and rotatably mounted in the casing in axial alignment with the bearing member and interchangeable therewith, means to operate said actuating member to open and close the valve member relatively to its seat, said valve member also being arranged to open automatically to permit the pressure fluid to drain rearwardly through the valve when the pressure of the fluid is relieved, and means to control the volume of drainage permitted to pass from the valve.

3. A valve of the character described comprising, in combination, a casing provided with a chamber therein having inlet and discharge passages for a pressure fluid communicating therewith, a valve seat within said chamber at said discharge passage, a bearing member rotatably mounted in said casing, a gravity and pressure actuated valve member pivotally mounted in said chamber to close against said seat, an actuating member for said valve member loosely interlocked therewith to permit a slight amount of lost motion therebetween and rotatably mounted in the casing in axial alignment with the bearing member and interchangeable therewith, and a bifurcated manually operated member spanning the valve casing and operatively connected to the actuating member and to the bearing member to rotate both of said members in unison to open and close the valve member relatively to its seat, said valve member also being arranged to open automatically to permit condensation to drain through the valve when the pressure of the fluid is relieved.

4. A valve of the character described comprising, a combination, a casing provided with a chamber therein having inlet and discharge passages for a pressure fluid communicating therewith, a valve seat within said chamber at said discharge passage, interchangeable cylindrical members mounted in the casing in axial alignment one with the other, a valve member pivotally mounted in the casing between said cylindrical members and loosely interlocked with one of the latter to permit a slight amount of lost motion therebetween, and means to rotate said cylindrical members to open and close said valve member relatively to its seat, said valve member also being arranged to open automatically to permit condensation to drain through the valve when the pressure of the fluid is relieved.

5. A valve of the character described comprising, in combination, a casing provided with a chamber therein having inlet and discharge passages for a pressure fluid communicating therewith, a valve seat within said chamber at said discharge passage, interchangeable cylindrical members mounted in the casing in axial alignment one with the other, a valve member pivotally mounted in the casing upon said cylindrical members and operatively connected to one of the latter to permit a slight amount of lost motion therebetween, means to rotate one of the cylindrical members to open and close said valve member relatively to its seat, said valve member also being arranged to open automatically to permit condensation to drain through the valve when the pressure of the fluid is relieved, and means to restrict the movement of the rotatable cylindrical member to close the valve member whereby the volume of drainage permitted to pass rearwardly through the valve is controlled.

6. A valve of the character described comprising, in combination, a casing provided with a chamber therein having inlet and discharge passages for a pressure fluid communicating therewith, a valve seat within said casing at said discharge passage, interchangeable cylindrical members mounted in the casing in axial alignment one with the other, a valve member pivotally mounted in the casing between said cylindrical members and operatively connected to one of the latter to permit a slight amount of lost motion therebetween, a bifurcated manually operated member spanning the valve casing and operatively connected to both of the cylindrical members to rotate said members in unison to open and close said valve member relatively to its seat, said valve member being arranged to open automatically to permit condensation to drain through the valve when the pressure of the fluid is relieved, and a screw carried by the bifurcated member and adapted to engage the casing to restrict the movement of said bifurcated member to close the valve member whereby the volume of drainage permitted to pass rearwardly through the valve is controlled.

7. A valve of the character described comprising, in combination, a casing provided with a chamber therein having inlet and discharge passages for a pressure fluid communicating therewith, a valve seat within said casing at said discharge passage, interchangeable rotatable members mounted in the casing in axial alignment one with the other, a rocker arm pivotally mounted upon one of said rotatable members and movable in unison therewith with a slight amount of lost motion therebetween, a valve member pivotally mounted upon said rocker arm, means to rotate the member carrying the rocker arm to open and close said valve member relatively to its seat, said valve member being arranged to open automatically to permit condensation to drain through the valve when the pressure of the fluid is relieved, and means to control the volume of drainage permitted to pass from the valve.

8. A valve of the character described comprising, in combination, a casing provided with a chamber therein having inlet and discharge passages for a pressure fluid communicating therewith, a valve seat within said casing at said discharge passage, interchangeable rotatable members mounted in the casing in axial alignment one with the other, a rocker arm pivotally mounted between said rotatable members and operatively connected thereto with a slight amount of lost motion therebetween, a valve member pivotally mounted upon said rocker arm, a bifurcated manually operated member spanning the valve casing and operatively connected to both of the interchangeable members to rotate the latter to open and close the valve member relatively to its seat, said valve member being arranged to open automatically to permit condensation to drain through the valve when the pressure of the fluid is relieved, and means to restrict the movement of said bifurcated member to close the valve member whereby the volume of drainage passing through the valve is controlled.

ENOCH E. NEAL.